(No Model.) 3 Sheets—Sheet 1.
D. A. SAILOR.
COTTON GIN.
No. 451,279. Patented Apr. 28, 1891.
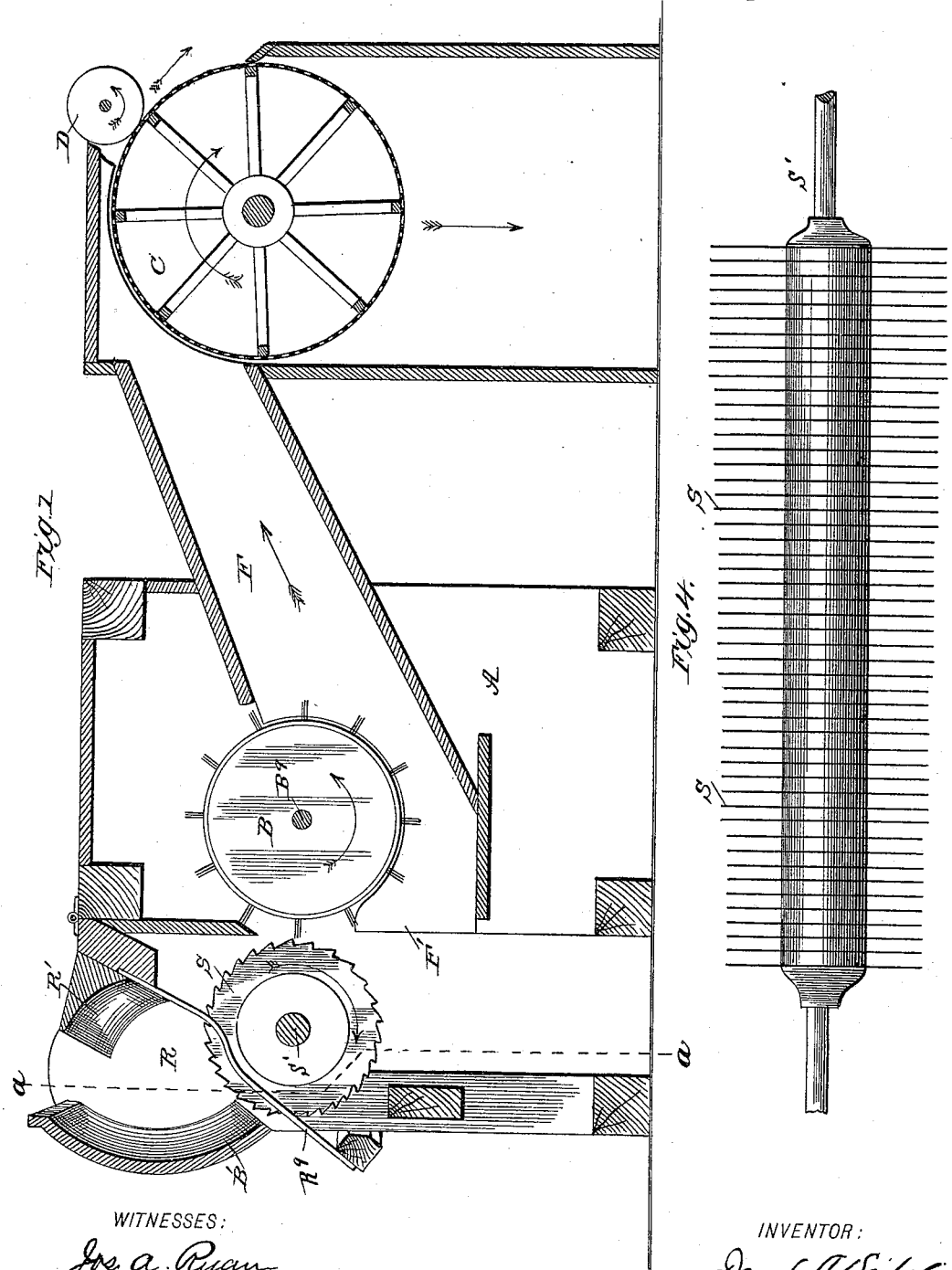
WITNESSES:
Jos. A. Ryan
C. D. Dunn
INVENTOR:
David A. Sailor
BY C. M. Alexander
ATTORNEYS (No Model.) 3 Sheets—Sheet 2.
D. A. SAILOR.
COTTON GIN.
No. 451,279. Patented Apr. 28, 1891.
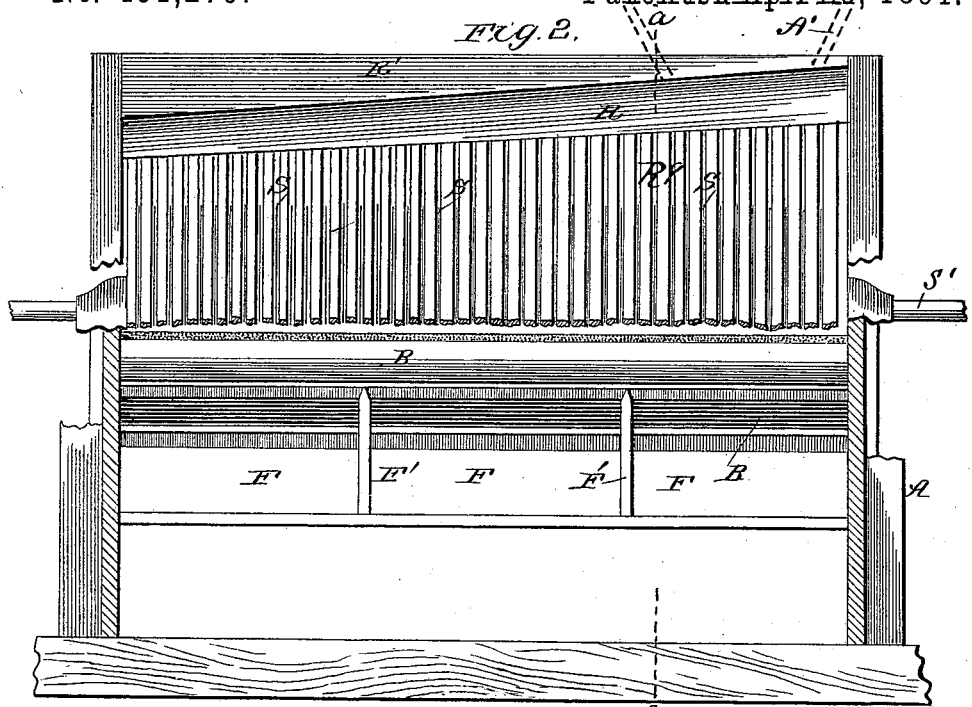
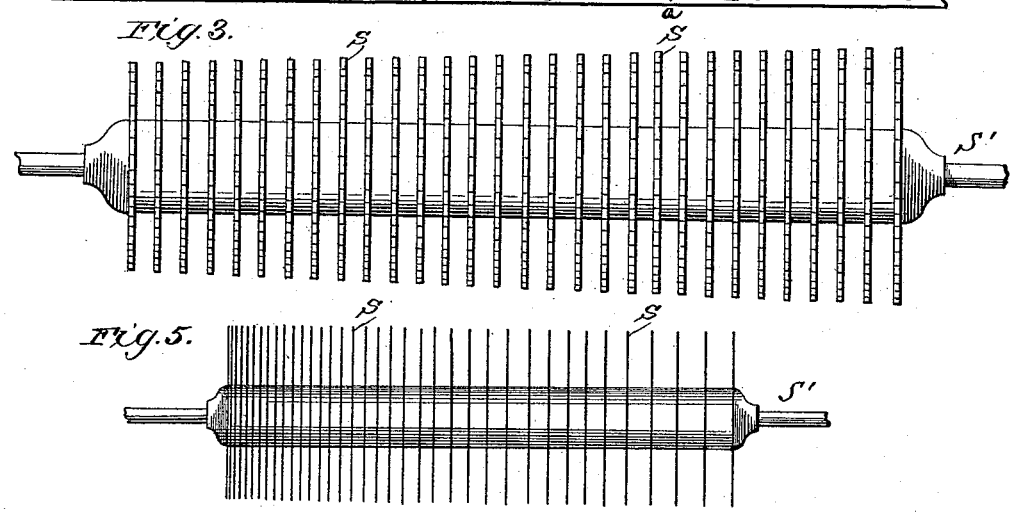
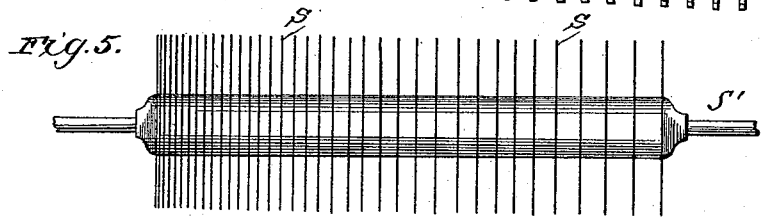
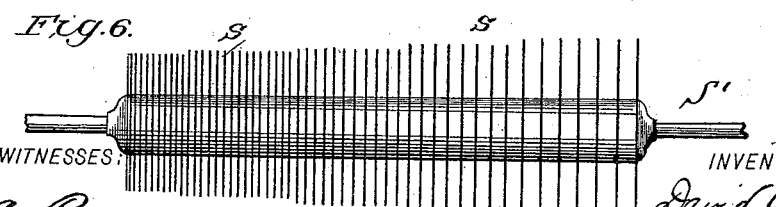
WITNESSES: INVENTOR:
Jos. A. Ryan David A. Sailor
C. D. Davis BY C. M. Alexander
ATTORNEYS (No Model.) 3 Sheets—Sheet 3.
D. A. SAILOR.
COTTON GIN.
No. 451,279. Patented Apr. 28, 1891.
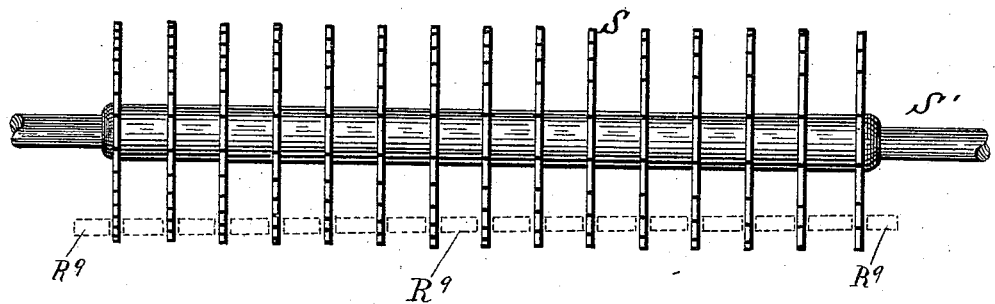
Fig. 7.
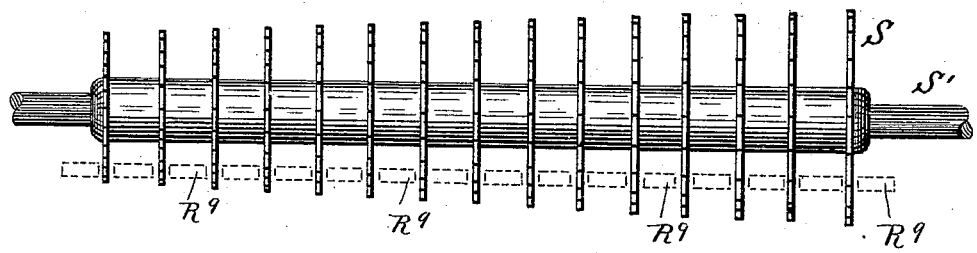
Fig. 8.
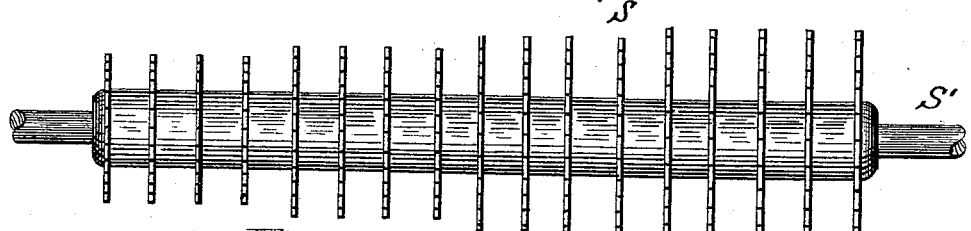
Fig. 9.
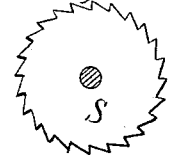
Fig. 10. Fig. 11.
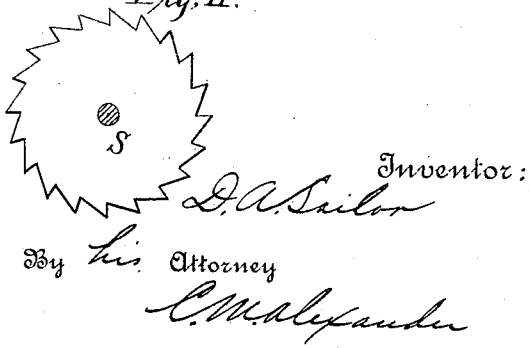
Witnesses:
F. C. Gibson
C. D. Davis
Inventor:
D. A. Sailor
By his Attorney
C. M. Alexander

UNITED STATES PATENT OFFICE.

DAVID A. SAILOR, OF LITTLE ROCK, ARKANSAS.

COTTON-GIN.

SPECIFICATION forming part of Letters Patent No. 451,279, dated April 28, 1891.

Application filed January 23, 1890. Serial No. 337,813. (No model.)

*To all whom it may concern:*

Be it known that I, DAVID A. SAILOR, a citizen of the United States, residing at Little Rock, State of Arkansas, have invented certain new and useful Improvements in Cotton-Gins, of which the following is a specification, reference being had therein to the accompanying drawings, in which—

Figure 1 represents a longitudinal vertical sectional view of a cotton-gin and condenser connected together; Fig. 2, a transverse sectional view on the line *a a* of Fig. 1; Figs. 3, 4, 5, and 6, detail views of the saw-shaft; Figs. 7, 8, and 9, detail views showing more clearly the arrangement of the saws; Figs. 10 and 11, detail side views of the saws upon opposite ends of the saw-shaft, showing the decrease in size of the saws and their teeth.

In the ordinary process of ginning the cotton is fed regularly into the roll-box the full length of the latter, and the result is that the seed in the "roll" is being continually wrapped with fresh cotton and crowded toward the axial center of the roll-box throughout its length until the roll is so hard and compact that it requires a great deal of power to turn it, the seed is only half-stripped of its lint and making hundreds of revolutions without coming in contact with the revolving saws.

It is one of the essential objects of this invention to obviate these difficulties experienced in the ordinary method of ginning and provide simple means for causing an endwise movement of the roll and gradually diminishing the size of the same in the direction of its endwise motion, the cotton being fed into the roll-box only at one end of the same, whereby all packing of the seed into a compact mass in the axial center of the roll-box is avoided and the ginning accomplished with a minimum expenditure of power.

A further object is to provide means for more rapidly, thoroughly, and effectually removing the short lint from the seed as the roll moves toward the discharge end of the roll-box, as will be presently seen.

A still further object is to provide means for separating the lint into two or more grades or classes, the long lint being kept separate from the short lint as it comes from the ginning mechanism, as will presently appear.

Referring to the annexed drawings, A designates the gin-stand; R, the roll-box formed by the concave breast-board B' and returning-board R'; S, the saws secured on a shaft S', journaled in the gin-stand and extending up between the ribs $R^9$, of ordinary construction, into the roll-box; B, the brush-cylinder secured on a shaft $B^9$, journaled in the rear of the saws and adapted to sweep or brush the lint from the saws in the ordinary manner; F, a flue connecting the brush-cylinder with the condenser, which latter consists of a large wire-cloth or perforated sheet-metal cylinder C and a smaller solid roller D, journaled above the latter.

The several arrows indicate the direction of the motion of the parts.

The cotton is fed into the larger end (the feed end) of the roll-box by hand or by a suitable feeding device, a hopper A' being shown in dotted lines in Fig. 2, and the stripped seed discharged from the smaller end, which is therefore termed the "discharge end."

The roll-box gradually tapers from its feed end toward its discharge end, as shown, which is for the purpose of diminishing the size of the roll as it travels toward the discharge end of the roll-box, whereby the saws will be enabled to perform the work of stripping the lint from the seed in a much more rapid and thorough manner than has been possible in this class of gins heretofore. By thus decreasing the size of the roll as it travels from one end to the other of the roll-box it will be observed that I provide for more effectually removing the lint from the seed by causing the roll to make a greater number of revolutions as it travels toward the discharge end of the roll-box, thereby bringing the seed into contact with the saws oftener than when the roll is the same size throughout its length. This action is permitted by the seed becoming cleaner and cleaner, and thereby occupying less space as it travels toward the discharge end of the roll-box. The saws are provided with teeth gradually diminishing in size and increasing in number from the feed end of the roll-box toward the smaller end—that is to say, the saw at the feed end of the roll-box is provided with coarse teeth, the saw next to it is provided with finer teeth, and so on toward the smaller end of the roll-box, as shown in Fig. 7. If desired, the saws may also diminish in size from the feed end toward the discharge end, as shown in Figs. 3 and 8, and they may, if the exigencies of the case require it, be arranged closer together as they approach the discharge end of the roll-box, as shown in Figs. 5 and 6. The construction shown in Fig. 5, however, is not herein claimed.

The saws may be arranged in groups diminishing in diameter, as shown in Figs. 4 and 9, the teeth of one group being finer than the teeth of the preceding group, and so on toward the discharge end of the roll-box, and instead of gradually decreasing the spaces between the saws I may arrange them in groups also, as shown in Fig. 6, the saws of one group being closer together than those of the preceding group, and so on toward the discharge end of the roll-box. In either case the result will be approximately the same; but I prefer grouping the saws, as it will be less expensive and easier constructed. By thus decreasing the size and increasing the number of the teeth of the saws the seed will be more effectually and rapidly stripped of its short lint by the action of the finer saws, the coarser teeth removing the long lint. The lint on the seed becomes shorter and shorter as the same travels toward the smaller end of the roll-box, until it is entirely stripped of its lint, when it falls out through the narrow space between the lower end of the breast-board and the saws, as usual. By arranging the saws closer together and decreasing their size toward the discharge end of the roll-box the above operation will be rendered still further effectual.

To grade the lint as it is removed from the saws by the brush-wheel, I provide the flue F with one or more vertical partitions F', which extend from a point under and in front of the brush-cylinder up over the condensing-cylinder to a point near the roller D. These partitions will prevent the long lint from being commingled with the short lint, as is evident, the long lint being forced up into the flue directly in the rear of the coarse saws and the shorter lint into the second flue or passage, and so on when more than two partitions are employed.

In operation the condensed and graded cotton passes from between the condensing-cylinder and roller out through the opening in the upper end of the casing of the condenser, the loose dust passing down through the cylinder into the chamber below the same.

It will be observed that the gradual diminishing in size of the roll-box is rendered possible by reason of the fact that the seed as it travels toward the discharge end becomes cleaner, and therefore occupies less space. The result of thus diminishing the size of the roll toward the discharge end is to cause the roll to revolve more rapidly as it travels along, and thereby bring the seed into contact with the finer saws oftener, whereby the seed is more effectually and thorougly stripped of its lint. The roll is caused to travel more rapidly toward its small end, for the reason that the diminution of the roll-box and the diminution of the saws in the cases where the latter are diminished in diameter are not in the same proportion, the diminution of the saws being only sufficient to get a more shallow hold upon the roll at the discharge end, the greatest depth at the feed end being only about one and one-eighth inch. The diminution of the roll-box being much greater in proportion gives the periphery of the roll a much shorter travel; hence the increased number of revolutions.

The direct and only advantage derived from decreasing the size of the saw-teeth is to present more teeth to grasp the short lint, and thereby more effectually clean the seed and prevent waste.

The cotton will travel with a spiral motion from the larger (the feed) end of the roll-box toward the smaller (the discharge) end thereof, by reason of the fact that a vacancy is created at the smaller end by the discharge of the stripped seed therefrom. The resistance to the travel of the roll caused by the taper of the roll-box is but slight in comparison with the force exerted in the opposite direction by feeding only in one end of the roll-box. The taper of the roll-box is but slight, as it should not exceed three inches in the length of the roll-box, the usual length of which is about five feet.

When saws varying in diameter are employed, the ribs R⁹ are preferably arranged, as usual, in a line extending transversely of the machine at right angles to the sides thereof, with the saws projecting between the ribs to different extents, as shown in dotted lines R⁹ in Fig. 8; but when the saws are all the same size, as shown in Fig. 7, the ribs are preferably arranged in a line at a slight oblique angle to the sides of the gin, as shown by dotted lines R⁹ in Fig. 7, whereby the saws will project a less distance into the roll-box toward the discharge end. The reason for this is that the saws operating upon seed nearly cleaned do not require to penetrate so deeply into the roll. When the saws reach too deeply into the roll of seed, it causes too much agitation in the roll, causing the seed to drop before being thoroughly cleaned of its lint. By thus causing the roll to travel toward the discharge or smaller end of the roll-box I avoid the difficulty experienced with the ordinary gins now in use—namely, the crowding and packing of the seed toward the axial center of the roll-box—and am therefore enabled to drive the saws with much less power than is usually required.

Having thus fully described my invention, what I claim, and desire to secure by Letters Patent, is—

1. The combination, with a series of gin-saws, of a roll-box tapering interiorly from its feed end toward its discharge end, substantially as and for the purpose described.

2. A gin-saw shaft provided with saws having teeth diminishing in size gradually or in groups toward one end of the shaft, substantially as described.

3. A series of gin-saws secured in a shaft, the teeth of some of the saws being smaller than the teeth of the others, substantially as and for the purpose described.

4. A series of gin-saws secured on a shaft and diminishing in size toward one end of the shaft, substantially as and for the purpose described.

5. A series of gin-saws secured on a shaft, the teeth of the saws and the saws themselves diminishing in size toward one end of the shaft, substantially as set forth.

6. The combination, with the saws, of the brush-cylinder, a flue leading out from the rear of the brush-cylinder to a suitable place of deposit, and a partition in the said flue to grade the lint, the said partition extending forward under the brush-cylinder, substantially as and for the purpose described.

7. The combination, with the saws and brush-cylinder, of a condensing device, a flue extending from the rear of the brush-cylinder to the condenser, and a partition in the said flue extending from beneath the brush-cylinder to a point near the cylinder of the condenser, substantially as and for the purpose described.

8. In a cotton-gin, the combination, with a roll-box and a series of ribs, of a series of revolving saws projecting into the roll-box between the ribs to different extents, substantially as described.

9. A gin-saw shaft provided with a series of saws, the spaces between the saws and the saws themselves diminishing in size toward one end of the shaft, substantially as and for the purpose described.

In testimony whereof I affix my signature in presence of two witnesses.

DAVID A. SAILOR.

Witnesses:
DUDLEY E. JONES,
C. D. HEMMING.